United States Patent [19]
Cho

[11] 3,788,633
[45] Jan. 29, 1974

[54] ADJUSTABLE ANGLE PLATE ARRANGEMENT

[76] Inventor: Antonio Cho, 8048 Feldblumenstr. 127, Zurich, Switzerland

[22] Filed: Aug. 25, 1969

[21] Appl. No.: 852,532

[30] Foreign Application Priority Data
Aug. 30, 1968 Switzerland.................. 13116/68

[52] U.S. Cl. ............ 269/60, 33/174 S, 90/DIG. 20, 269/69, 269/76, 269/79, 269/307, 269/309
[51] Int. Cl.............................................. B23q 3/04
[58] Field of Search... 269/307, 309, 55, 69, 74, 76, 269/79, 60; 279/6; 33/174 S; 77/63; 90/59.7, DIG. 20; 143/169

[56] References Cited
UNITED STATES PATENTS
2,343,637   3/1944   Bochenek .................... 269/69 X
2,366,385   1/1945   Comfort ....................... 33/174 S
2,930,132   3/1960   Muench ....................... 33/174 S Primary Examiner—Andrew R. Juhasz
Assistant Examiner—James F. Coan

[57] ABSTRACT

A work supporting plate for a machine tool is pivotally mounted between two normally fixed base arms and two swinging arms, the plate and arms being connected by a common pivot. A segment on each swinging arm has a row of uniformly spaced bores in an arc about the pivot axis for coarse adjustment of the angular plate portion in integral multiples of 1°, and a threaded abutment on each swinging arm permits the swinging arms with the plate to be finely adjusted relative to the base arms.

10 Claims, 6 Drawing Figures

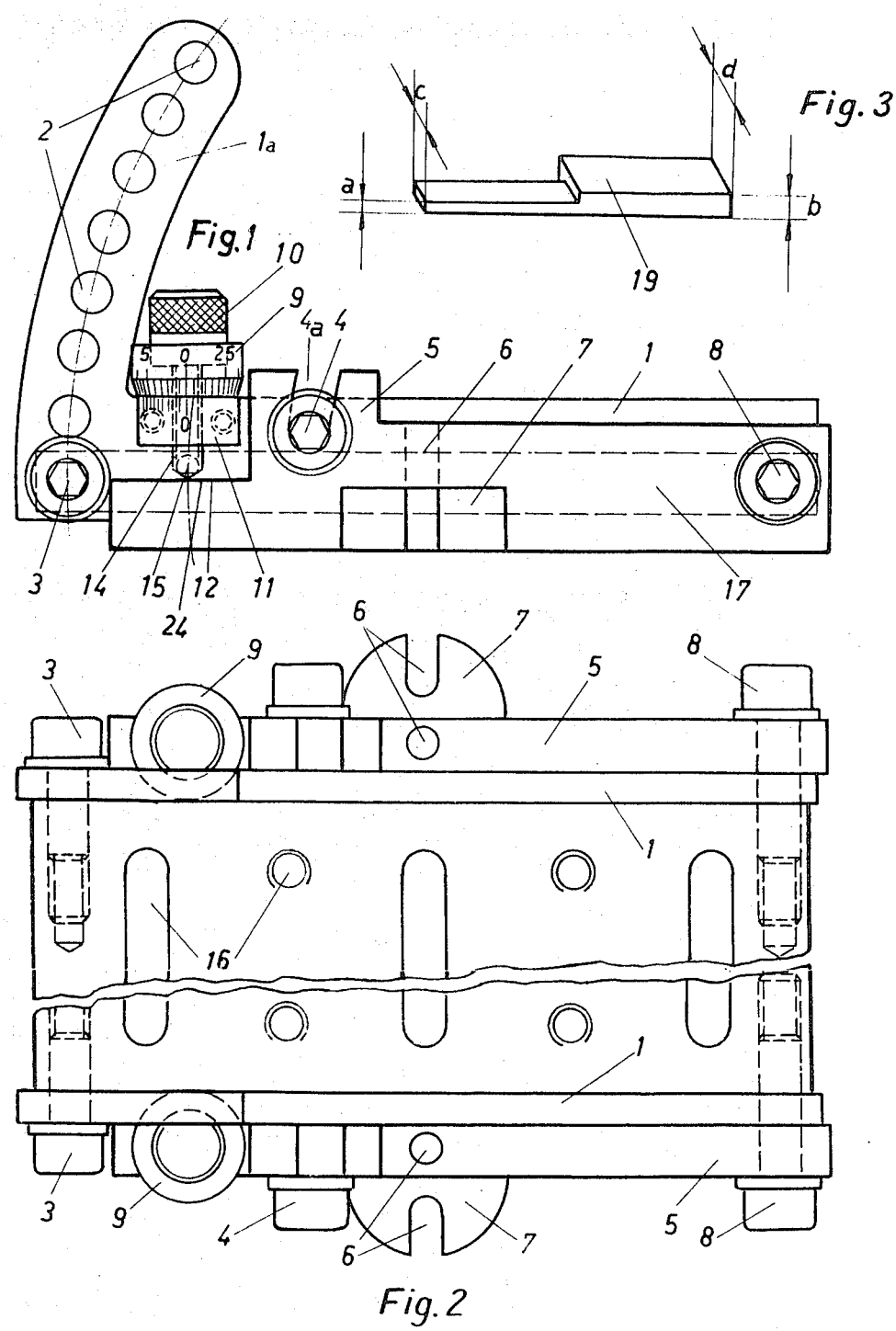

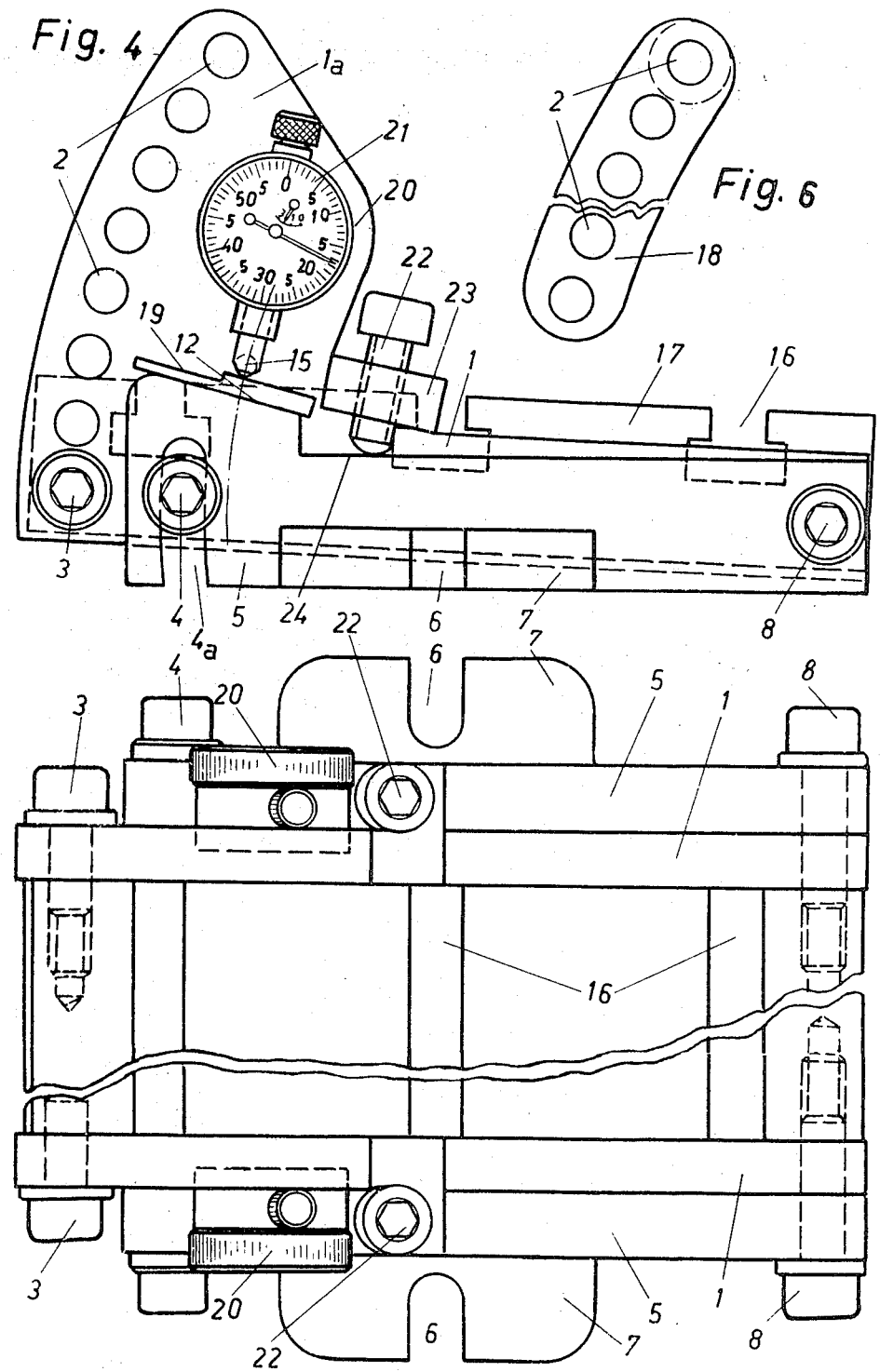

ADJUSTABLE ANGLE PLATE ARRANGEMENT

This invention relates to work supporting plates or tables for machine tools and the like, and particularly to an adjustable angle plate arrangement which permits the work supporting surface of the plate or table to be set at precisely defined angles relative to a reference plane on the machine tool.

When an adjustable angle plate has to be set precisely, it has been common practice heretofore to employ gage blocks for spacing one end of the work supporting plate from a reference plane in such a manner that the sine of the desired angle is equal to the length ratio of the gage block and of the plate, the two lengths respectively constituting a cathete and the hypotenuse of a rectangular triangle whose other cathete is defined by the reference plane.

This method is very effective when the angle of plate inclination is small, and if only a limited number of angles need to be set. For angles greater than approximately 45°, the sine function varies little with the magnitude of the angle, and high precision cannot readily be achieved. If many different angles have to be set, a correspondingly large number of gage blocks is needed.

The object of the invention is the provision of a simple adjustable-angle plate arrangement which permits any angle between a work supporting surface and a reference plane to be set with equal precision.

With this object and others in view, as will hereinafter become apparent, the invention provides a base which defines the necessary reference plane, a work supporting member which defines the supporting surface and a pivot whose axis is parallel to the reference plane, and which secures one portion of the work supporting member to the base for angular movement of the surface and arcuate movement of another portion of the work supporting member about the pivot axis.

At least one swinging element is amounted on the base for swinging movement about the aforementioned pivot axis and is formed with a plurality of bores spaced from each other along a circular arc centered in the pivot axis. Fasteners engageable with each bore can fasten the other portion of the work supporting member to the swinging element in respective angular positions relative to the swinging element. Cooperating abutments on the swinging element and on the base engage each other in a point spaced from the pivot axis during the swinging movement of the element, the swinging element and the base constituting carriers respectively associated with the two abutments.

The position of one of the abutments on the associated carrier can be adjusted toward and away from the afore-mentioned point in a direction which is substantially tangential relative to a circle through the point and centered in the pivot axis.

Other features, additional objects and many of the attendant advantages of this invention will be readily appreciated as the same becomes better understood from the following detailed description of preferred embodiments when considered in connection with the accompanying drawings in which:

FIG. 1 shows an adjustable angle plate of the invention in side elevation;

FIG. 2 shows the angle plate of FIG. 1 in fragmentary top plan view;

FIG. 3 illustrates a gage block for use with angle plates of the invention in a perspective view;

FIGS. 4 and 5 show a modified, adjustable angle plate of the invention in views corresponding to those of FIGS. 1 and 2 respectively; and FIG. 6 illustrates an extension member for use in either illustrated angle plate in fragmentary side elevation.

Referring initially to FIGS. 1 and 2, there is seen a rectangular work supporting plate or table 17 equipped with undercut slots and threaded bores 16 in its flat top surface for work holding clamps as is conventional. Two partly threaded coaxial bores enter opposite narrow edge faces of the plate 17 near one end of the plate 17 and receive the threaded ends of respective bolts 8. The smooth shank portion of each bolt 8 pivotally engages closely fitting bores in respective longitudinal ends of a base arm 5 and of a swinging arm 1. The arms 1, 5 are long and narrow plates arranged on edge on either side of the work plate 17.

The base arms 5 are equipped with lateral lugs 7 having notches 6 by means of which the base arms 5 may be fastened on the frame of a machine tool in fixed spatial relationship to the tools. The end of each swinging arm 1 remote from the associated bolt 8 carries an integral segment 1a which is a plate member provided with a row of uniformly spaced bores 2 extending in a circular arc about the common axis of the bolts 8. The centers of the bores 2 are spaced 5° apart along the arc. In the illustrated position of the apparatus, bolts 3 pass through the lowermost bores 2 of the two segments 1a into partly threaded bores in the work supporting plate 17 whose common axis is parallel to the axis of the pivot bolts 8.

A slot 4a in each base arm 5 receives a set screw 4 mounted on the associated swinging arm 1 and permits the relative angular position of the arms 1, 5 to be fixed in any part of an arc of more than 5° about the axis of the bolts 8.

A bracket 11 extends from the end of each swinging arm 1 adjacent the segment 1a over an abutment face 12 of the associated base arm 5. A threaded bore in the bracket 11 receives the threaded spindle 14 of a micrometer, the lower axial end of the spindle 14 carrying a spherical anvil 15, and the upper axial end carrying a knurled knob 10 equipped with a circumferential scale 9. An index mark on the bracket 11 cooperates with the knob 10.

For greater precision and convenience, there is provided a single, elongated gage block 19. One of its longitudinal halves has a thickness $a$ and a width $c$, the other half having a thickness $b$ and a width $d$, the dimensions $a$, $b$, $c$, $d$ corresponding to R sin 1°, R sin 2°, R sin 3° and R sin 4°, wherein R is the distance between the contact face or center of the anvil 15 and the axis of the bolts 8.

The lower edges of the base arms 5 define a reference plane whose position relative to the non-illustrated machine tool is normally fixed. If it is desired, by way of example, to adjust the work supporting face of the plate 17 to an angle of 22°17′30″ relative to the reference plane, the bolts 3 are withdrawn from the plate 17, and the plate is pivoted on the bolts 8 until the bolts 3 can be inserted into the associated bores of the plate 17 through the fifth bores 2 in the segments 1a. The plate 17 is thereby set at 20° clockwise from the position shown in FIG. 1.

The circular scale 9 on each knob 10 is divided into 60 circumferential parts, and the pitch of the threads on the spindle 14 is selected so that the anvil travels axially a distance R sin 1° when the knob makes a full turn, whereby each division on the scale corresponds to 1 minute of angular displacement of the arm 1.

After the pivoting movement of the plate 17 through 20°, as described above, the set screws 4 are loosened, and the knobs 9 are each turned from the initial zero position by 17.50' to pivot the arms 117'30'' on the bolts 8. The plate 17 is thereafter lifted manually to provide space between the anvil 15 and the abutment face 12 for insertion of the gage block 19 in such a position that the dimension b (R sin 2°) separates the anvil 15 from the abutment face 12 when the plate 17 is ultimately lowered as far as the gage block will permit. The set screws 4 are tightened after the adjustment has been made on both sides.

The apparatus illustrated in FIGS. 4 and 5 differs from that described with reference to FIGS. 1 and 2 in details of the fine adjustment mechanism only. One end of a work supporting plate or table 17 is pivotally fastened by bolts 8 between normally fixed pairs of base arms 5 and swinging arms 1, and bolts 3 permit the other end of the work table 17 to be fastened to a segment 1a on each of the swinging arms 1 in any one of eight angular positions defined by bores in the segment 1a, the bores being spaced 5° center-to-center along a circular arc about the pivot axis of the bolts 8.

The relative angular position of the arms 1 and 5 is normally fixed by set screws 4 passing through open-ended slots 4a in the fixed base arms 5 and threadedly engaging the swinging arms 1, and may be adjusted by means of screws 22 when the set screws 4 are loosened. Each adjusting screw 22 is threadedly movable in an integral bracket 23 on an associated arm 1, and its rounded tip engages an abutment face 24 on the corresponding base arm 5. The relative angular position of each set of arms 1, 5 can be read from the circular scale 21 of a dial gage 20 whose spherical anvil 15 is directed toward an abutment face 12 of the base arm 5 in a direction which is precisely tangential relative to a circle of radius R centered in the pivot axis of the bolts 8 and passing through the point of contact of the anvil 15 with the face 12. The scale 21 of the gage 20 may be turned about its axis by means of a knob as is conventional, a full turn of the dial hand corresponding to an anvil displacement of R sin 1°.

FIG. 4 shows the apparatus in a position in which the work supporting face of the table 17 is inclined at an angle of 2°17'30'' relative to the reference plane defined by the bottom edges of the base arms 5. This position is brought about as follows:

Because of the small angle of inclination chosen for the work supporting surface, the bolts 3 engage the first bores 2 of the arms 1a. While the table 17 is in its starting position and precisely parallel to the reference plane, the scale 21 is adjusted to indicate zero. The screw 22 is then turned to provide space for the thickness b (R sin 2°) of the gage block 19 between the anvil 15 and the abutment face 12, and the screw is further turned to engage the anvil 15 with the block 19, and thereby to set the hand of the dial gage to 17.5' as shown in FIG. 4.

The eight bores 2 of the arms 1a shown in FIGS. 1 and 4 permit precise setting of the angle between the work supporting surface of the plates or tables 17 and the reference plane of the base arms 5 for angles of 0° to 45° which is normally sufficient. If so desired, greater angles may be set by means of extension segments 18 of the type shown in FIG. 6 which are secured to the arms 1a by means of bolts and nuts in an obvious manner.

While not specifically illustrated, the scale 9 of the micrometer shown in FIG. 1 may be equipped with a venier permitting readings to the nearest second of arc, and the dial gage 20 may be equipped with a second hand for the same purpose, as is known in itself.

The precision of the angle for which the work supporting surface of the table 17 is set is independent of the magnitude of the angle. The angle may be set simply and reproducibly by means of a single gage block. The apparatus consists of few parts shaped in such a manner that they can be machined easily with great precision in all critical dimensions. The adjustable angle plate of the invention can therefore be built at relatively low cost.

The apparatus can be adapted to work pieces of different dimensions by merely replacing the work supporting table 17, and the same arms 1, 5 and associated elements may be employed for holding work pieces which differ greatly in their dimensions and in their weights. Even very heavy pieces can be held securely in precisely defined angular relationships to the tools of an associated machine.

The arms 1, 5 of each pair of arms are symmetrical relative to a longitudinal plane perpendicular to the pivot axis of the bolts 8. They may therefore be reversed if it is desired that the work supporting surface slope obliquely downwardly from the pivot axis in the bolts 8. The total range of movement of the table 17 is thus 90° upward and 90° downward from the horizontal position when extension segments 18 are employed. Yet, the precision of the angle setting is the same throughout the entire range of 180°.

What is claimed is:

1. An adjustable angle plate arrangement comprising, in combination:
   a. base means defining a reference plane;
   b. a work supporting member defining a supporting surface;
   c. pivot means having an axis parallel to said reference plane and securing one portion of said member to said base means for angular movement of said surface and for arcuate movement of another portion of said member spaced from said one portion about said axis;
   d. swinging means mounted on said base means for swinging movement about said axis and formed with a plurality of bores spaced from each other along a circular arc centered in said axis;
   e. fastening means engageable with said member and with each of said bores for fastening said other portion to said swinging means in respective angular positions relative to said swinging means;
   f. cooperating abutment means on said swinging means and on said base means respectively, said abutment means engaging each other in a point spaced from said axis during said swinging movement, said swinging means and said base means constituting respective carriers associated with said abutment means; and
   g. adjusting means for adjusting the position of one said abutment means on the associated carrier toward and away from said point in a direction substantially tangential relative to a circle through said point centered in said axis.

2. An arrangement as set forth in claim 1, wherein said bores are uniformly spaced along said arc.

3. An arrangement as set forth in claim 2, wherein the uniform spacing of said bores is an integral multiple of 1°.

4. An arrangement as set forth in claim 1, wherein said pivot means secure said work supporting member to said base means for angular movement toward and away from a position in which said surfaces is parallel to said reference plane, the surface being substantially flat.

5. An arrangement as set forth in claim 1, further comprising indicator means indicating the position of said one abutment means relative to the associated carrier.

6. An arrangement as set forth in claim 5, wherein said one abutment means is threadedly movable on said associated carrier about an axis extending in said substantially tangential direction.

7. An arrangement as set forth in claim 1, wherein said swinging means include a pair of elongated swinging arms, and said base means include a pair of elongated base arms, said work supporting member being releasably secured to respective longitudinal end portions of said arms by said pivot means and axially interposed between the members of each pair, said swinging arms being each formed with a plurality of said bores uniformly spaced along respective circular arcs of the same radius about said axis, said fastening means include two releasable fastening members respectively engageable with the bores of each swinging arm and with said work supporting member, and said abutment means include two abutment members respectively adjustable on said swinging arms in said substantially tangential direction and engageable with respective associated base arms.

8. An arrangement as set forth in claim 7, wherein said adjusting means include a micrometer screw on each swinging arm and indicator means for indicating the angular position of said screw, and said abutment members are respective anvils on said micrometer screws.

9. An arrangement as set forth in claim 7, further comprising two dial gages on said swinging arms, said abutment members being respective anvils of said gages, and said adjustment means including threaded members on said swinging arms abuttingly engageable with said base arms respectively.

10. An arrangement as set forth in claim 7, wherein the uniform spacing of said bores in said swinging arms is equal to an integral multiple of 1° of said arcs, the arrangement further including a gage block having a plurality of pairs of parallel surfaces and adapted to be interposed between each of said abutment members and the associated base arm in a plurality of different positions in which the parallel surfaces of respective pairs of parallel surfaces simultaneously engage said abutment member and the associated base arm, the angular positions of said swinging arm relative to the associated base arm differing by an integral number of degrees from each other in said different positions of said gage block.

* * * * *